(12) United States Patent
Schaal

(10) Patent No.: US 9,227,670 B2
(45) Date of Patent: Jan. 5, 2016

(54) MOUNT FOR AN ELECTRICAL OR ELECTRONIC COMPONENT IN AN ENGINE COMPARTMENT OF A MOTOR VEHICLE

(75) Inventor: Thomas Schaal, Oberstenfeld (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 791 days.

(21) Appl. No.: 13/483,147

(22) Filed: May 30, 2012

(65) Prior Publication Data

US 2012/0305322 A1    Dec. 6, 2012

(30) Foreign Application Priority Data

May 30, 2011    (DE) .......................... 10 2011 050 707

(51) Int. Cl.
*B60K 1/00*    (2006.01)
*B62D 25/08*    (2006.01)

(52) U.S. Cl.
CPC ................ *B62D 25/088* (2013.01); *B60K 1/00* (2013.01); *B62D 25/082* (2013.01); *B60Y 2400/61* (2013.01)

(58) Field of Classification Search
USPC ................ 903/951, 952; 180/65.1, 291, 68.5; 296/193.03, 193.09, 203.02, 205
See application file for complete search history.

(56) References Cited

U.S. PATENT DOCUMENTS 5,417,471 A    5/1995    Kreis et al.

FOREIGN PATENT DOCUMENTS

| DE | 40 41 016 | 7/1992 |
| DE | 10 2009 036 495 | 2/2011 |
| JP | 2007-83962 | 4/2007 |
| JP | 2010861 A | 1/2010 |
| KR | 20050100989 A | 10/2005 |

*Primary Examiner* — Jeffrey J Restifo
*Assistant Examiner* — Erez Gurari
(74) *Attorney, Agent, or Firm* — Gerald E. Hespos; Michael J. Porco; Matthew T. Hespos

(57) ABSTRACT

An electrical or electronic component (3) of a motor vehicle is mounted in an engine compartment of the motor vehicle by suspending the component (3) from a suspension cross-brace (1) and connecting the component (3) on a motor vehicle splashboard that separates the engine compartment from a passenger compartment. Such a mount permits a relatively heavy and relatively large electrical or electronic component to be accommodated in the engine compartment and securely mounted there.

5 Claims, 1 Drawing Sheet

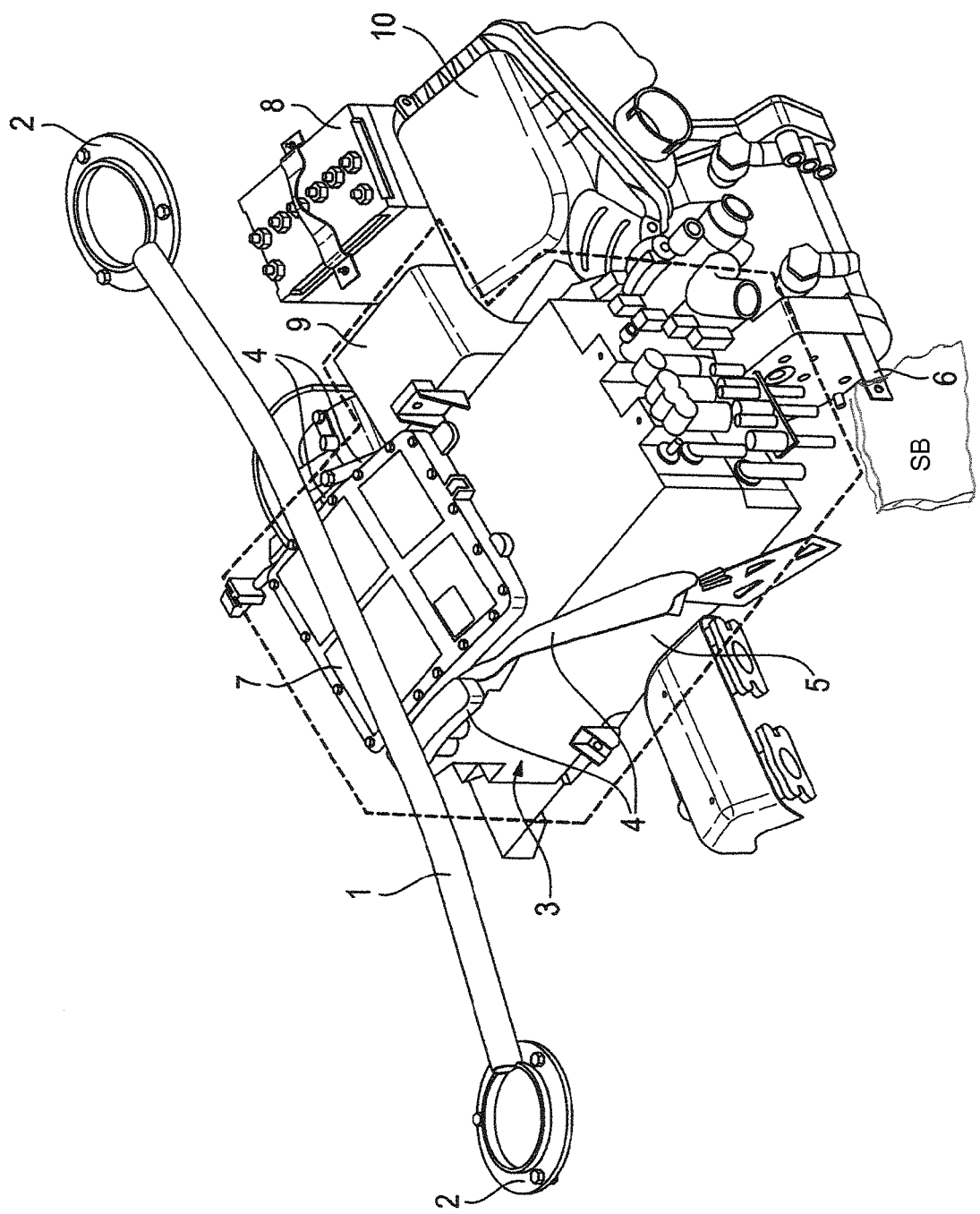

MOUNT FOR AN ELECTRICAL OR ELECTRONIC COMPONENT IN AN ENGINE COMPARTMENT OF A MOTOR VEHICLE

CROSS REFERENCE TO RELATED APPLICATION

This application claims priority under 35 USC 119 to German Patent Appl. No. 10 2011 050 707.8 filed on May 30, 2011, the entire disclosure of which is incorporated herein by reference.

BACKGROUND OF THE INVENTION

1. Field of the Invention

The invention relates to the mount for an electrical or electronic component of a motor vehicle in an engine compartment of the motor vehicle, wherein the component is mounted in a suspension cross-brace.

2. Description of the Related Art

Suspension cross-braces are used in automobile construction to increase the rigidity of a vehicle body. Suspension cross-braces often are installed subsequently to increase the torsional strength of the vehicle body and are used, for example, in vehicles without a fixed roof structure (convertible or roadster). The suspension cross-brace connects the two front or rear suspension-strut domes, thereby preventing the position of the domes from changing with respect to one another and maintaining the geometry of the chassis. Twisting phenomena of the wheel toe are reduced, and driving behavior becomes better and more direct, particular when cornering.

DE 10 2009 036 495 A1 discloses a mount of the type mentioned above that relates to an electrical or electronic component in the engine compartment of the motor vehicle. The suspension cross-brace described in the document is a body component that forms a housing that is open at the top symmetrically with respect to the longitudinal axis of the vehicle. A separate cover closes off the housing in a way that is sealed with respect to spray water. The housing accommodates an engine control unit that performs open-loop and closed-loop control and monitoring of engine functions. The engine control unit is accommodated in a protected fashion by virtue of the mounting of the engine control unit in the housing of the suspension cross-brace. Thus the housing functions satisfactorily under difficult operating conditions such as, for example, temperature influences, vibrations of the vehicle engine and/or shocks due to the state of the road, as well as excessive tension and insufficient tension.

The object of the invention is to provide a mount for an electrical or electronic component of a motor vehicle in the engine compartment of the motor vehicle that permits a relatively heavy and relatively large electrical or electronic component to be accommodated in the engine compartment and securely mounted there.

SUMMARY OF THE INVENTION

The invention relates to a mount that suspends a component in the suspension cross-brace and additionally mounts the component on a motor vehicle splashboard that separates the engine compartment from a passenger compartment of the motor vehicle.

The mount for the relatively heavy and relatively electrical or electronic component therefore serves not only the suspension cross-brace but also the splashboard. The weight of the component is taken up by the suspension cross-brace. To provide rotationally fixed mounting, the component also is mounted securely to the splashboard of the vehicle. Part of the weight of the component also can be taken up perfectly well by the splashboard. The electrical or electronic component therefore is attached securely in the engine compartment.

The component preferably comprises power electronics for a hybrid vehicle or an electric vehicle.

The component is suspended from the suspension cross-brace and therefore is positioned essentially underneath the suspension cross-brace. Sufficient space to accommodate the component underneath the suspension cross-brace is ensured when the motor vehicle is driven by small electric motors on the wheels of an axle. As a result, the installation space above this axle becomes free and can be used for installation of the electrical or electronic component, such as the power electronics. Short power lines and cooling lines also are enabled for supplying the components, in particular the power electronics and the electric motors.

The suspension cross-brace may be mounted in the two suspension domes of a front axle of the motor vehicle when the engine compartment is at the front of the vehicle.

The lateral positioning enables the component to be suspended simply and securely in the suspension cross-brace by spaced apart bearing means connected to the suspension cross-brace. The bearing means are connected to the component on sides that face away from one another. Securing clips are particularly simple bearing means.

A securing clip also can be a bearing means for mounting the electrical or electronic component to the splashboard, and particularly the side of the component facing the splashboard.

The mount of the invention permits the electrical or electronic components, such as the power electronics of the motor vehicle, to be protected against vibrations. The arrangement of the power electronics in a suspended arrangement on the suspension cross-brace permits the power electronics to be accommodated in the engine compartment. As a result it is not necessary to arrange the power electronics, for example, in the trunk of the motor vehicle and hence more space remains for the battery of the hybrid or electric vehicle in the trunk.

The mount of the invention also permits a relatively heavy and relatively large electrical or electronic component, namely power electronics, to be accommodated and mounted securely in the engine compartment. The suspended arrangement permits the component or power electronics to be arranged at a short distance underneath the suspension cross-brace. An engine hood of the vehicle therefore can be positioned directly above the suspension cross-brace with respect to the closed position of said engine hood. Therefore, the vehicle can be made relatively low in the region of the engine hood.

Further features of the invention can be found in the dependent claims, the appended drawing and the description of the preferred exemplary embodiment illustrated in the drawing, without being restricted thereto.

BRIEF DESCRIPTION OF THE DRAWING

FIG. 1 is a perspective view of the suspension cross-brace, power electronics and further components in the engine compartment of a motor vehicle as seen from above and behind.

DETAILED DESCRIPTION OF THE PERFERRED EMBODIMENT

A suspension cross-brace 1 is provided in the region of its two ends with annular receptacles 2 supported on and connected to two suspension-strut domes (not shown) of a front axle of the motor vehicle. The suspension cross-brace 1 is embodied, for example, as a tube and functions to mount an electrical or electronic component, specifically power electronics 3 for a hybrid or electric vehicle. The mounting occurs in the engine compartment of the motor vehicle. The power electronics 3 are suspended beneath the suspension cross-brace 1 by two securing clips 4 that are connected to the suspension cross-brace 1. The two securing clips 4 are spaced from one another by a distance that corresponds to the width of the power electronics 3 measured parallel to the longitudinal extent of the suspension cross-brace 1. The securing clips 4 bear respectively on the side walls 5 (only one is seen) of the power electronics 3 that face away from one another and is connected to the power electronics 3 via attachment means (not illustrated). The fixed connection of the respective securing clip 4 to the suspension cross-brace 1 and to the power electronics 3 achieves a fixed connection of the suspension cross-brace 1 and power electronics 3.

A splashboard SB is between the engine compartment and passenger compartment of the motor vehicle and a securing clip 6 connects the side of the power electronics 3 facing the splashboard to the splashboard SB.

The attachment of the securing clips 4 and 6 to the suspension cross-brace 1, the power electronics 3 and/or the splashboard is carried out by known attachment means, for example by screw connection. A non-detachable connection, for example a welded connection between the securing clip 4 and the suspension cross-brace 1, also is expedient.

Components of the power electronics 3 may form a monitoring unit 7 which is accommodated in a housing which is positioned on and connected to a housing of the actual power electronics 3.

Further components that are arranged adjacent to the power electronics 3 in the engine compartment of the motor vehicle are illustrated in FIG. 1. The components are a 12 V battery 8 for the vehicle, a protection switch unit 9 and an air filter 10.

The contour of the components that form the power electronics are presented by the dot-dash line.

The electronic components of the power electronics 3 are mounted permanently in the vehicle by the suspension cross-brace 1 and the support on the splashboard. The power electronics 3 are mounted symmetrically with respect to half the length of the suspension cross-brace 1. In particular if the vehicle is driven by relatively small electric motors on the wheels of the axle, in particular the front axle, the installation space that becomes free above the axle can readily be used to accommodate the power electronics 3 there. This results in short power lines and cooling lines for supplying the power electronics 3, the small electric motors and other components.

What is claimed is:

1. A mount for a power electronics component of a hybrid or electric motor vehicle in an engine compartment of the motor vehicle, the power electronics component having opposite side walls that face away from one another and defining a width of the power electronics component, the power electronics component further having a rear surface, the motor vehicle having a motor vehicle splashboard that separates the engine compartment from a passenger compartment of the motor vehicle, the mount comprising:
   a suspension cross brace mounted in the engine compartment forward of the splashboard and having a specified length in a lateral direction of the vehicle;
   first and second spaced apart suspension cross-brace bearings extending from the suspension cross-brace at positions laterally of the power electronics component and coupled to the opposite side walls of the power electronics component to suspend the power electronics component from a symmetrical position along the length of the suspension cross-brace; and
   at least one splashboard bearing for mounting the rear surface of the power electronics component to a forward facing surface of the motor vehicle splashboard and at a position rearward of the suspension cross brace and the suspension cross brace bearings.

2. The mount of claim 1, wherein the suspension cross-brace is mounted in two suspension domes of a front axle of the motor vehicle.

3. A hybrid or electric motor vehicle, comprising:
   an engine compartment;
   a motor vehicle splashboard that separates the engine compartment from a passenger compartment of the motor vehicle;
   a suspension cross brace mounted in the engine compartment forward of the splashboard and having a specified length in a lateral direction of the vehicle
   a power electronics component in the engine compartment, the power electronics component having opposite first and second spaced apart side walls facing away from one another and defining a width of the power electronics component, the power electronics component further having a rear surface facing toward the splashboard;
   first and second spaced apart suspension cross brace bearings extending from the suspension cross brace at positions laterally of the power electronics component and coupled to the first and second spaced apart side walls of the power electronics component and suspending the power electronics component from a symmetrical position along the length of the suspension cross-brace; and
   at least one splashboard bearing for mounting the rear surface of the power electronics component to a forward facing surface of the motor vehicle splashboard and at a position rearward of the suspension cross brace and the suspension cross brace bearings.

4. The hybrid or electric motor vehicle of claim 3, wherein the suspension cross brace bearings are non-detachably coupled to the first and second spaced apart side walls of the power electronics component.

5. The hybrid or electric motor vehicle of claim 4, wherein the suspension cross brace bearings are non-detachably coupled to the first and second spaced apart side walls of the power electronics component by welding.

* * * * *